(12) United States Patent
Gunzinger et al.

(10) Patent No.: US 11,966,973 B2
(45) Date of Patent: Apr. 23, 2024

(54) ELECTRONIC COMMUNICATION NETWORK

(71) Applicant: SWISSTRADINGBOX AG, Zürich (CH)

(72) Inventors: Anton Gunzinger, Zürich (CH); Edgar Blum, Niederrohrdorf (CH); Hans Burkhard, Kloten (CH); Rico Piantoni, Wila (CH); David Müller, Hinwil (CH); Markus Berner, Brugg (CH); Samuel Zahnd, Frauenfeld (CH)

(73) Assignee: SWISSTRADINGBOX AG, Zurich (CH)

( * ) Notice: Subject to any disclaimer, the term of this patent is extended or adjusted under 35 U.S.C. 154(b) by 929 days.

(21) Appl. No.: 16/578,491

(22) Filed: Sep. 23, 2019

(65) Prior Publication Data

US 2020/0020033 A1    Jan. 16, 2020

Related U.S. Application Data

(63) Continuation of application No. 15/314,513, filed as application No. PCT/CH2015/000084 on Jun. 3, 2015, now abandoned.

(30) Foreign Application Priority Data

Jun. 5, 2014  (CH) .................................. 00867/14

(51) Int. Cl.
*G06Q 40/00*  (2023.01)
*G06Q 40/02*  (2023.01)
(Continued)

(52) U.S. Cl.
CPC ............. *G06Q 40/04* (2013.01); *G06Q 40/02* (2013.01); *H04J 3/06* (2013.01); *H04J 3/065* (2013.01); *H04J 3/0638* (2013.01)

(58) Field of Classification Search
USPC ......................................................... 370/503
See application file for complete search history.

(56) References Cited

U.S. PATENT DOCUMENTS

| | | | | |
|---|---|---|---|---|
| 7,954,109 B1 * | 5/2011 | Durham | ................ | H04L 43/18 |
| | | | | 709/224 |
| 8,374,084 B2 * | 2/2013 | Randall | ................ | H04W 72/12 |
| | | | | 370/230 |

(Continued)

FOREIGN PATENT DOCUMENTS

| | | |
|---|---|---|
| EP | 0411748 A2 | 2/1991 |
| WO | 2010/077829 A1 | 7/2010 |
| WO | 2014043420 A1 | 3/2014 |

OTHER PUBLICATIONS

"FPGA Accelerated Low-Latency Market Data Feed Processing," Gareth W. Morris et al., High Performance Interconnects 2009, HOTI 2009, 17th IEEE Symposium On, IEEE, Aug. 25, 2009, pp. 83-89.

(Continued)

*Primary Examiner* — Gregory B Sefcheck
*Assistant Examiner* — Majid Esmaeilian
(74) *Attorney, Agent, or Firm* — Oppedahl Patent Law Firm LLC

(57) ABSTRACT

An electronic communication network comprises a server platform and client data processing devices. Each client data processing device is configured to submit electronic messages to the server platform, provided with a timestamp. The server platform is configured to process incoming electronic messages strictly in a sequence corresponding to the timestamp. The electronic communication network comprising at least one switch, wherein the switch is arranged to receive electronic messages from a plurality of the client data processing devices. the switch comprises a buffer and is configured to store the electronic messages produced by the (Continued)

client data processing devices in the buffer, and to transfer the electronic messages in a manner sorted according to the timestamp provided to each electronic message by the time generator of the client data processing device submitting the electronic message, so that the electronic message with the oldest time is transferred first.

16 Claims, 6 Drawing Sheets

(51) Int. Cl.
*G06Q 40/04* (2012.01)
*H04J 3/06* (2006.01)

(56) References Cited

U.S. PATENT DOCUMENTS

| | | | |
|---|---|---|---|
| 8,635,378 B1* | 1/2014 | Wentzlaff | G06F 13/1673 710/12 |
| 8,964,622 B2* | 2/2015 | Gelal | H04L 12/18 370/312 |
| 2002/0026321 A1 | 2/2002 | Fairs et al. | |
| 2004/0068461 A1 | 4/2004 | Schluetter | |
| 2004/0260640 A1 | 12/2004 | Crosthwaite et al. | |
| 2005/0015323 A1 | 1/2005 | Myr | |
| 2005/0074033 A1 | 4/2005 | Chauveau | |
| 2006/0067225 A1* | 3/2006 | Fedorkow | H04L 12/5601 370/235 |
| 2008/0224902 A1* | 9/2008 | Samuels | H03M 7/3084 341/51 |
| 2008/0243675 A1 | 10/2008 | Parsons et al. | |
| 2010/0031340 A1* | 2/2010 | Batke | H04L 63/0428 726/13 |
| 2010/0138334 A1 | 6/2010 | Warsaw et al. | |
| 2012/0011203 A1* | 1/2012 | Itoh | H04L 51/04 709/205 |
| 2012/0095893 A1 | 4/2012 | Taylor et al. | |
| 2012/0215992 A1* | 8/2012 | Stanfill | G06F 9/544 711/E12.001 |
| 2013/0114601 A1* | 5/2013 | Branscomb | H04L 45/74 370/392 |
| 2013/0194944 A1* | 8/2013 | Soyak | H04K 3/822 370/252 |
| 2013/0258851 A1* | 10/2013 | Mayya | H04L 47/32 370/235 |
| 2014/0101017 A1 | 4/2014 | Mintz et al. | |
| 2014/0297800 A1* | 10/2014 | Mutschler | H04L 67/10 709/217 |
| 2015/0071309 A1* | 3/2015 | Aweya | H04J 3/0664 370/503 |
| 2015/0222568 A1* | 8/2015 | Heine | H04L 49/15 370/401 |
| 2015/0262297 A1 | 9/2015 | Callaway et al. | |
| 2015/0262298 A1 | 9/2015 | Callaway et al. | |

OTHER PUBLICATIONS

"A Low-Latency Library in FPGA Hardware for High Frequency Trading (HFT)," John W. Lockwood et al., High Performance Interconnects, (HOTI) 2012 IEEE 20th Annual Symposium On, IEEE, Aug. 22, 2012, pp. 9-16.
"High Frequency Trading Acceleration Using FPGAs," Christian Leber et al., Field Programmable Logic and Applications, (FPL), 2011 International Conference On, IEEE, Sep. 5, 2011, pp. 317-322.
International Search Report for PCT/CH2015/000084, dated Aug. 14, 2015.
Written Opinion of International Searching Authority for PCT/CH2015/000084, dated Aug. 14, 2015.
International Preliminary Report on Patentability for PCT/CH2015/000084, dated Dec. 6, 2016.
CH Search Report for application No. CH 8672014, dated Sep. 26, 2014.
Ken Inoue et al., "Low-latency and high bandwidth TCP/IP protocol processing through an integrated HW/SW approach," INFOCOM 2013 Proceedings IEEE, Apr. 14, 2013.
Written Opinion of Intellectual Property Office of Singapore for application No. 11201610138W, dated Dec. 11, 2017.

* cited by examiner

ELECTRONIC COMMUNICATION NETWORK

The invention relates to an electronic communication network, in particular to a high speed communication system that is highly available.

BACKGROUND

Standard networks from the world of supercomputers have already been suggested for certain applications, in order to improve the speed of communication networks, due to the fact that such standard networks are counted as belonging to the quickest networks worldwide.

Such supercomputer networks on the one hand are optimized for point-to-point communication and on the other hand for multicast/broadcast. Point-to-point communication is particularly important to supercomputers, since in many applications, many "equally authorized" computers operate on a single task, and a communication with an "arbitrary" (set by the task) partner is necessary. A message is sent to a group which is defined in advance, in the case of a multicast or broadcast. Thereby, in the supercomputer world, it is assumed that all partners receive the message, and if a single computer cannot receive the message, then as a rule the computation usually has to be stopped, since it no longer makes sense to compute further given the absence of individual computers.

In certain specific applications, such as for a "stock exchange" system for electronic trading, information flows from clients to a server platform and back again, according to a point to point communication pattern, and in the case of a broadcast pattern, from the server platform to all clients.

A network from the application "supercomputer" has characteristics other than those required in the application "stock exchange". For example, in the case of a stock [exchange] trading application, it would be disruptive if, as is envisaged with supercomputer networks, another client computer is inundated with information due to an error or a wanted action, to the extent that it can no longer operate properly. In the case of a broadcast, the complete system can come to a standstill and stop, if an individual one of the client computers does not accept the broadcast notification, be it due to a technical problem or deliberately.

It would therefore be advantageous if the disadvantages of a supercomputer network could be eliminated, without thereby having to forego the advantage of the high speed.

Moreover, it can be advantageous if a network for this application of "stock exchange" were to be scalable, and almost any number of client computers were able to be connected. Thereby, it can also make sense to apply several server platform data processing devices (matchers) for reasons of performance.

Yet a further problem with the application "stock exchange" is the re-synchronization of an individual client data processing device after a local interruption, e.g. due to a technical problem. According to the state of the art, this synchronization is effected by way of an independent second channel, by way of the client data processing device being supplied by this channel with information on the already effected trading activities, until it is at the same "level of knowledge" as the other client data processing devices. With high-performance systems, it can occur that the re-synchronization requires hours or is even no longer possible or that the trade even has to be interrupted for a certain time, in order to permit a complete synchronization, due to these high quantities of information.

An important complex of issues relates to those concerning the processing of messages. According to the state of the art, the clients are connected to the server via a network switch (switch), and common protocols, in particular TCP/IP protocols are applied. Common switches have buffers (buffer memories) for incoming messages, and these are processed and transferred according to a defined sequence. Thus on the one hand it is the arrival time and on the other hand it is also the port at which the related message arrives and the state, in which the switch currently is, which are relevant concerning the question as to which of two incoming messages are transferred first of all. It is due to this situation that a client can inadvertently or even deliberately exert an influence on the processing of the messages on another client, amongst other things by way of very many messages being sent within a short time and the hardware of the switch thus being brought to the limits of its capacity.

A further challenge is the intelligent receiving of information on the part of the client. With a high-performance system, there can be times, at which the client data processing device is no longer capable of processing and sorting the flood of information inundating it.

Finally, most of these systems are not designed as highly-availability systems. This characteristic can only be realized at a later stage at a very high expense/effort.

It is the object of the present invention, to at least partly eliminate the disadvantages outlined above, and to provide an electronic communication network which, for example, meet the demands concerning speeds, fairness, functional ability, and this being the case during and after the failure of components.

SUMMARY OF THE INVENTION

According to a first aspect of the invention, an electronic communication network is provided which comprises:
  a server platform and
  a plurality of client data processing devices;
  wherein each client data processing device is capable of submitting electronic messages to the server platform, and the server platform is configured to process these electronic messages;
  wherein each client data processing device comprises a time generator and is configured to provide each electronic message with a timestamp which represents the point in time of the submission of the electronic message;
  and wherein the system is configured such that the server platform processes incoming electronic message strictly in a sequence corresponding to the timestamp.

A "client data processing device" can be an integrated computer. However, it does not need to be a unit in the context of a "personal computer". It can also be divided onto several units which are spatially separated as the case may be, wherein the same applies to other data processing devices which are described in this application.

Thus one departs from the previous approach of working through the messages according to their arrival (first come, first served) and changes to a time-stamping system. This means that a message which is received at later stage under certain circumstances is processed before a message which had already arrived beforehand. This, under certain circumstances, also entails waiting for a certain time interval after the arrival of a message and before its implementation.

The electronic communication network can be constructed in a tree-like hierarchical manner with several levels, and this applies to all aspects of the invention, wherein the network nodes of the levels are formed in each case by switches, each with at least one uplink connection and several downlink connections.

According to an embodiment, at least one client data processing device comprises a network interface (in particular a network card), via which the client data processing device is connected to the server platform, and the time generator is integrated into the network interface.

In particular, one can envisage the time generator of all client data processing devices being identical and being provided by the system operator. For example, one can envisage each client obtaining a network interface which is provided by the system operator and which is identical for all clients, and only being able to communicate with the server platform via this.

The server platform can comprise a matcher as its key component, i.e. a server platform data processing device which is configured to manage an order book and to execute the function of the matching (assignment), i.e. bringing together offers and requests, in accordance with predefined rules (matching rules).

In embodiments, the electronic communication network comprises at least one network switch (switch), and the client data processing devices are connected to the matcher via this switch. The switch can serve as an aggregation switch in the case of a network architecture which results for the application described here.

In this text, a switch is generally to indicate a network node which permits a selective forwarding to certain (individual or several, under certain circumstances selectively also to all) connected devices—in the present context, the switch at the minimum permits an incoming message from a client data processing device to be forwarded further onto one or more server platform data processing device(s) and not for example also to all other client data processing devices. With regard to the context used here, a switch is a device ensuring this functionality, independently of whether all elements belonging thereto are arranged physically close to one another (for example in a common housing) or not.

The at least one switch can thereby be considered as part of the server platform, which does not mean that it is physically present at the location of the server. At least if the switch(es) is/are considered at part of the server platform, the capability of incoming messages being processed by the server platform strictly in accordance with the sequence specified by the timestamp, is a characteristic of the server platform itself, i.e. the server platform is capable of processing the incoming messages strictly in the sequence of the timestamp.

Now one can particularly envisage the sorting of the messages (i.e. the determining of the sequence by way of the timestamps) being effected in this switch, which then also comprises a suitably configured buffer. The switch then always firstly forwards that message with the oldest time. The messages are then processed in the server, according to the sequence defined by the timestamps.

Alternatively or supplementary to this, the sorting can also be effected and/or confirmed in a prioritiser which is part of the server platform data processing device or is serially connected in front of this (for example in a direct manner).

In redundant embodiments according to the third aspect which will hereinafter be dealt with in more detail, such a prioritiser can moreover suppress the second of two identical incoming messages.

From now, it is possible to ensure a fair execution of messages which can be reproduced at all times, in particular independently of network conditions and coincidences, due to the amazingly simple measure according to the invention (provision of the messages with a timestamp). This in turn permits the system to be designed in such a redundant manner, that it is accordingly available without interruption, even if a server or a switch fails.

In the system according to the first aspect of the invention, the time generator of the client data processing devices has an important function. There are various possibilities concerning measures which ensure that all client data processing devices are with the same time:
  identical time generator hardware provided by the system operator;
  the (for example identical for all) time generator can have a free oscillator or run via the network clock cycle;
  in both cases, the time generator can be repeatedly (for example periodically) synchronized via the server platform or via a trustworthy external source (for example GPS);
  the network clock cycle can be set by the server platform if the time generator runs via the network clock cycle.

According to a second aspect of the invention which can be combined with the first aspect, an electronic communication network is provided which comprises:
  a server platform; and
  a plurality of client data processing devices;
  wherein each client data processing device is configured to submit electronic messages to the server platform, and the server platform is configured to process these electronic messages;
  wherein each client data processing device is configured to monitor the number of unacknowledged electronic messages submitted to the server platform and is configured such that a predefined maximal number of such unacknowledged electronic messages is not exceed at any time.

Unacknowledged messages are messages for which no acknowledgement of receipt has yet been received.

The maximal number corresponds to a message credit, which is available to each client data processing device. The number of messages which are underway (i.e. sent, but not yet acknowledged) may not exceed a maximal number. By way of this, one prevents a client data processing device inadvertently or deliberately inundating the electronic communication network with messages and thus blocking electronic data channels, which would create unequal conditions for the various participants.

Moreover, one can envisage the size of at least one message buffer of the electronic communication network being matched to the maximal number, in a manner such that the buffer cannot overflow.

Such a buffer of the electronic communication network, in particular can be a buffer which according to the first aspect of the invention is applied for the message sorting.

Such a buffer of the electronic communication network for example can be a buffer of a switch. Thereby, it can be a dedicated (i.e. reserved for the downward link to the client) buffer, whose size then corresponds at least to that of the maximal number of messages. Such a buffer can alternatively also be a central buffer for several clients (i.e. either a central buffer of a switch or a buffer of a switch at a higher network level, for its part connected to several switches).

In embodiments, in which a sorting of arrived messages, in particular according to the first aspect, takes place in a switch, then the preferred criterion "size of the buffer is matched to the maximal number in a manner such that the buffer cannot overflow" applies at least to the buffer/buffers of the switch, in which the/a sorting takes place.

For example, one can envisage sufficient buffers being present in each network node in the case of a tree-like network structure, so as to intermediately store all unanswered messages of the client data processing devices assigned to the network nodes—with the switch of the lowermost level according to the client data processing devices connected to the switch, with a switch of the second level according to client data processing devices connected via a switch of the lowermost level (or possibly directly) to the switch of the second level, etc.

According to the third aspect of the invention which in particular can be combined with the first and/or second aspect, the server platform is designed redundantly, i.e. all components are present in duplicate, so that in principle (at least) two server platforms result.

Redundancy per se is also known with stock exchange trading systems per se. According to the state of the art, a corresponding, equivalent component is provided in the case of the failure of a system-relevant component—for example of the matcher. If need be, this is used instead of the failed component, wherein switch-on and synchronization procedures are necessary for this. The same applies to the transition back to the standard component, when this is capable of functioning again. A time, during which the system does not function, results in both cases, and the fair treatment of messages in the case of such a failure at a location in the system which is not known beforehand, is also quite a challenge.

According to the third aspect of the invention, the two server platforms are constructed identically and applied on equal terms during normal operation. All transactions are thus implemented on both server platforms. The server platforms are therefore configured such that with simultaneous operation, it is ensured at all times, that both server platform data processing devices s (or with a plurality of matchers per server platform, the server platform data processing devices s corresponding to one another) have identical order books at all times. This for example can be particularly ensured, by way of the messages being sorted on the basis of the timestamp, according to the first aspect of the invention, and/or, as the case may be, a credit system being applied, according to the second aspect. Inasmuch as random components play a part (for example with exactly identical timestamps in two messages), the pseudo random number generators of the two server platforms are designed identically and operate with the same starting values.

The switch or the system of switches which is used for connection to the client data processing devices is preferably also present in a redundant manner and thus at least in duplicate. The same of course also applies to the connections between the switches and connections from these to the server platform data processing device or client data processing device. One can envisage the switches of the two parallel systems not being connected to one another, but only the switches of the lowermost level being connected to the client data processing devices and possibly the switch of the uppermost level being connected to both server platform data processing devices, in the case of a system of switches with several levels. Each switch of a lower hierarchy level in each case is then only connected to one switch of the hierarchy level lying above this, and not for example also to the corresponding switch of the second parallel system, although this is not to be completely ruled out.

The switches of the uppermost level (the central switches; general in each case one per system) are connected to both server platform data processing devices (or if the tasks of the matcher are distributed in a segmented manner onto several matchers, are connected in each case to both server platform data processing devices of each segment). Alternatively, one can envisage each matcher, on arrival of a message, transferring this message to its counterpart (i.e. the other matcher). In both cases therefore, each message arrives twice at each assigned matcher during normal operation of the trading system without any failure of network components. Optionally, one can yet provide a delay unit in each case, wherein this slightly delays the message arriving via that system of switches, from which a quicker message transmission is expected, due to it being more direct.

A prioritiser—for example of the above described type, or also without the function of the sorting according to timestamp—can also be present, and this, with embodiments which also correspond to the first aspect, carries out a sorting according to the timestamp (inasmuch as this has not already been effected in a switch) and which in particular suppresses identical messages.

With embodiments of the third aspect, a unit which further processes the first valid message (for example transfers this) and suppresses identical copies can (also) be present on the part of each client data processing device.

With server platform data processing devices or with the segmentation into several server platform data processing devices with different competences, one can optionally envisage the two server platform data processing devices corresponding to one another having a direct "private" connection, via which they can also be synchronized with one another.

According to all aspects of the invention, one can envisage the client data processing device keeping copies of the parts of the order book which are of interest to the respective clients. The fourth aspect of the invention which is described hereinafter is also of particular interest with regard to this context.

According to a fourth aspect, a method is suggested, in order to synchronize a unit (a client or server platform data processing device for example) with other units of the system, for example in the case that this unit has failed or has been temporarily separated from the system, due to a malfunction. It is necessary for certain state data—for example the order book, if this is open—to be available to all participants, for a fair stock exchange trading operation, and it is only the respectively informed participant who can participate in the markets.

According to this fourth aspect, state data is continuously sent in a packet-wise manner to all participants (broadcast mode) during operation, wherein each packet contains a part of the state data. This is carried out intermittently with the sending of current messages, which is to say up-to-date messages (orders, confirmations, information on orders/transactions, to the market participants), until all data elements have been distributed, whereupon state data is sent afresh.

"Intermittently" in the context of the fourth aspect of the invention does not necessarily means that state data and current messages are always sent alternately. In contrast, if for example the system is not used to capacity, then several state data packets can be sent successively, before a current message is again sent, or possibly also vice versa.

The state data according to definition is current and correct at the point in time of the sending. A data element for example can comprise the number of offered papers of a certain title at a certain price. If now a message with regard to a data element arrives, this message is processed and the data element updated accordingly, if the data element concerned has already been synchronized, i.e. if for this data element a state data packet has already been sent. If however a synchronization has not yet been effected since the last failure of the unit concerned, and the respective data element does not yet comprise data, then the message is ignored.

The method according to the fourth aspect can be used, in order to synchronize the client data processing devices and/or server platform data processing devicess (in a redundant system). In particular, the application solely for client data processing devices in combination with another method for the matchers is also an option, apart from the favourable application to both.

In embodiments of the first, second, third and/or fourth aspect, the matcher can be configured as a dedicated logic circuit. A dedicated logic circuit is a hardware component or a group of hardware components, in which the logic functions, by way of which signals or data are processed, are implemented in a predefined manner by way of given circuits which are present in the hardware itself. This is in contrast to main processors of conventional computers (including server-computers) which are designed as "generic", universally useable microprocessors which work off a sequence of commands which are provided in a memory (as software), wherein it is only this software and not the circuit itself which is for a specific purpose.

Examples of dedicated logic circuits are field programmable gate arrays (FPGAs) (dedicated by the configuration, i.e. designed in an applications-specific manner) and ASICs, whose switching logic is set on manufacture and can no longer be changed.

The entirety of U.S. patent application Ser. No. 15/314,513 is herewith incorporated by reference.

DESCRIPTION OF THE DRAWING

Embodiment examples and principles of the invention are hereinafter explained by way of the Figures. There are shown in.

DETAILED DESCRIPTION

Figure 1:
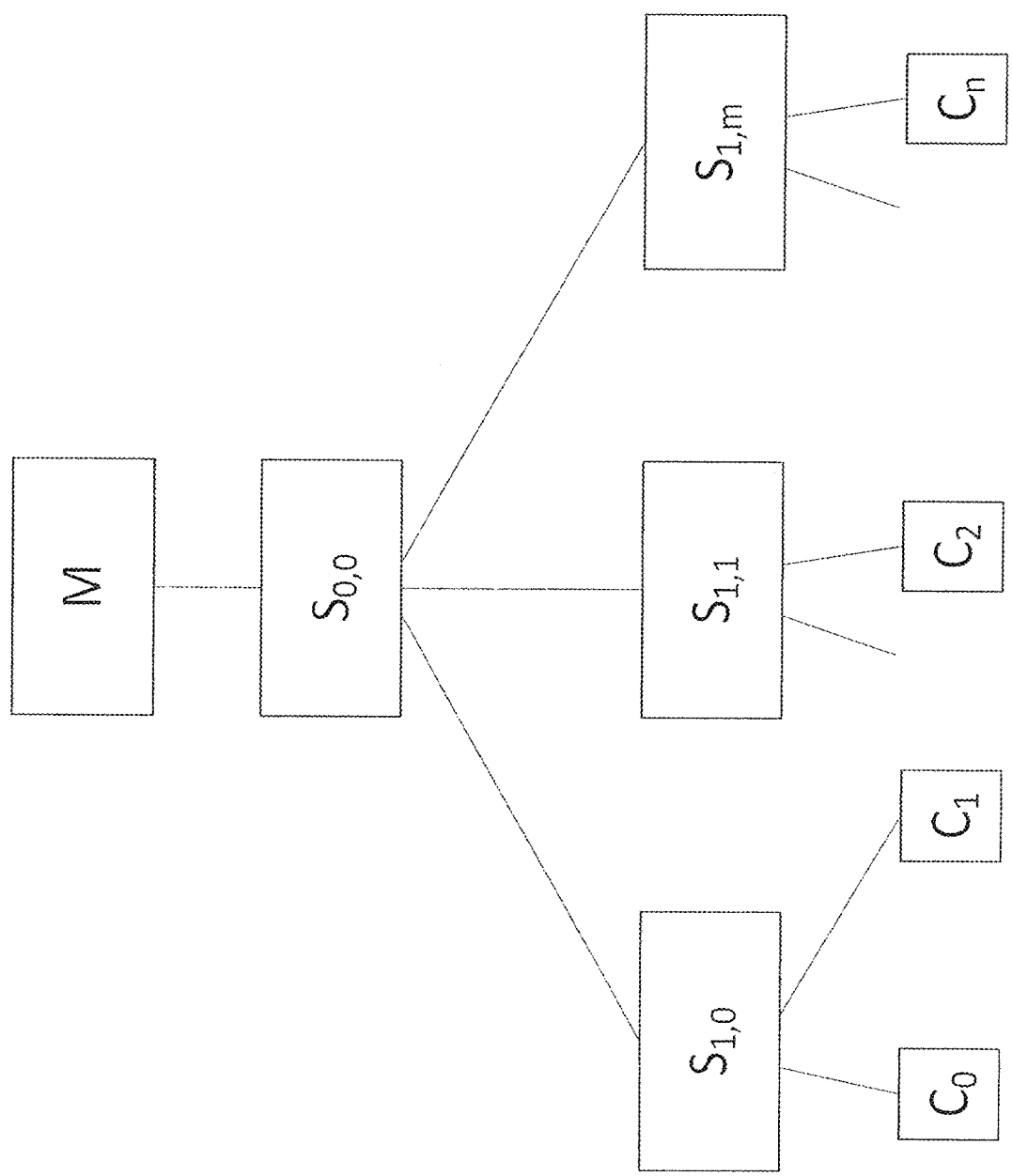
FIG. 1 a schematic overview of an electronic communication network.

Network architecture which is favourable for the rapid communications for stock exchange systems is represented in FIG. 1. It is thereby the case of a hierarchical network which is optimally adapted to the communication requirements in stock exchange applications. M indicates the server platform data processing devices or matcher. $S_{0,0}$ is the central switch, via which the clients (here indicated as clients $C_0, \ldots C_n$) communicate with the matcher. An optional further switch level with decentralized switches $S_{1,0}, \ldots S_{1,m}$ is moreover drawn in the represented embodiment example, wherein at least one client (generally several clients) are connected to each of these decentralized switches. An expansion to yet further levels and accordingly yet further architecture branching in a tree-like manner is also possible. The approach with the decentralized switches permits a good scalability and may be appropriate when the central switch does not physically have enough interfaces to all clients. It can be advantageous if each client is connected to the central switch via the same number of levels, since the transfer times are then roughly identical and, with the approach with a sorting according to a timestamp and which is discussed above, the waiting time before a message (for example an order) is transferred upwards can be kept shorter.

The switching logic of the at least one switch can optionally be such that it only permits messages from a client data processing device to the server platform data processing device, from the server platform data processing device to a certain client data processing device and from the server platform data processing device to all client data processing devices—which means that the communication pattern resulting in the electronic stock exchange trade is implemented in the switching logic of the network at the very beginning.

Figure 2:
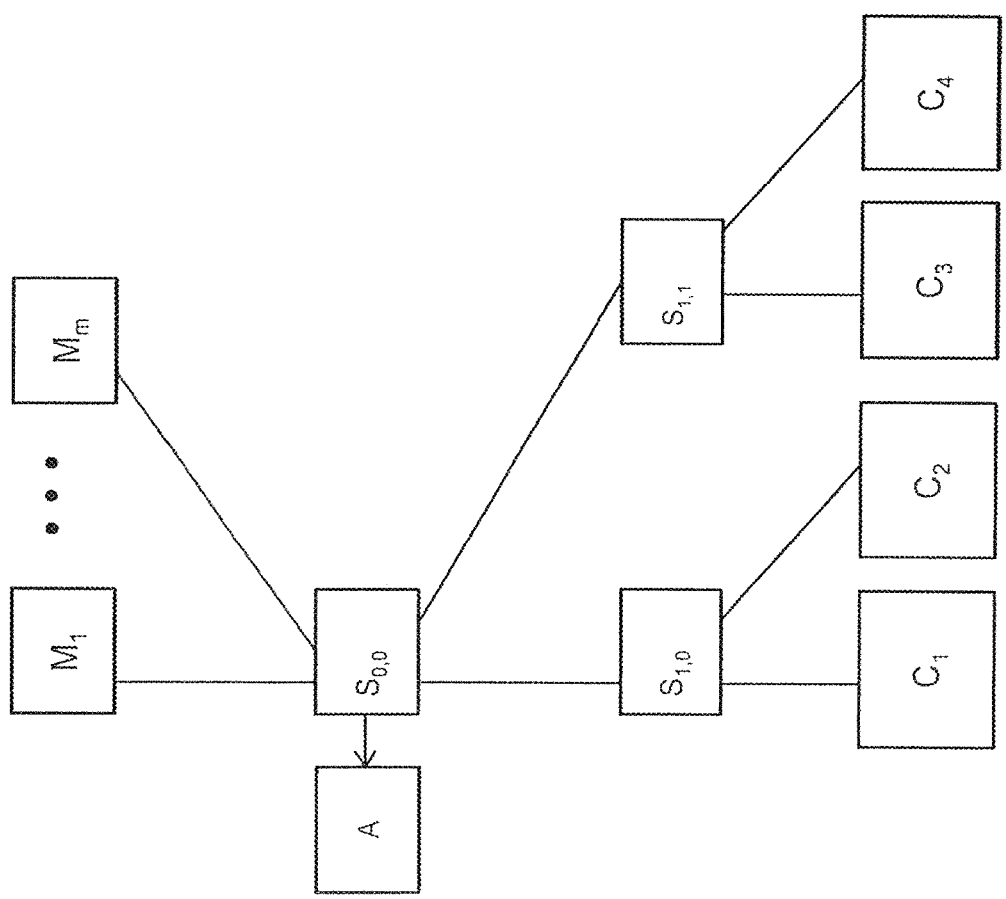
FIG. 2 an electronic communication network with several servers.

A division of the function of the matcher onto several matchers is also possible, and this is represented symbolically in FIG. 2. Each matcher is then responsible for one or more titles. The transfer to the correct matcher can be effected by the uppermost switch, for example on account of the target address.

The uppermost switch (i.e. the uppermost network node) can moreover optionally have a further output which stores all relevant messages which are transferred by this switch, in an archive A and thus makes this information available for example to the backoffice, for further processing. This option exists independently of whether only one matcher or, as in FIG. 2, several matchers are applied. However, this option is particularly favourable with the application of several matchers, since it permits a central archiving. Alternatively, each matcher can also have an individual archive.

Figure 3:
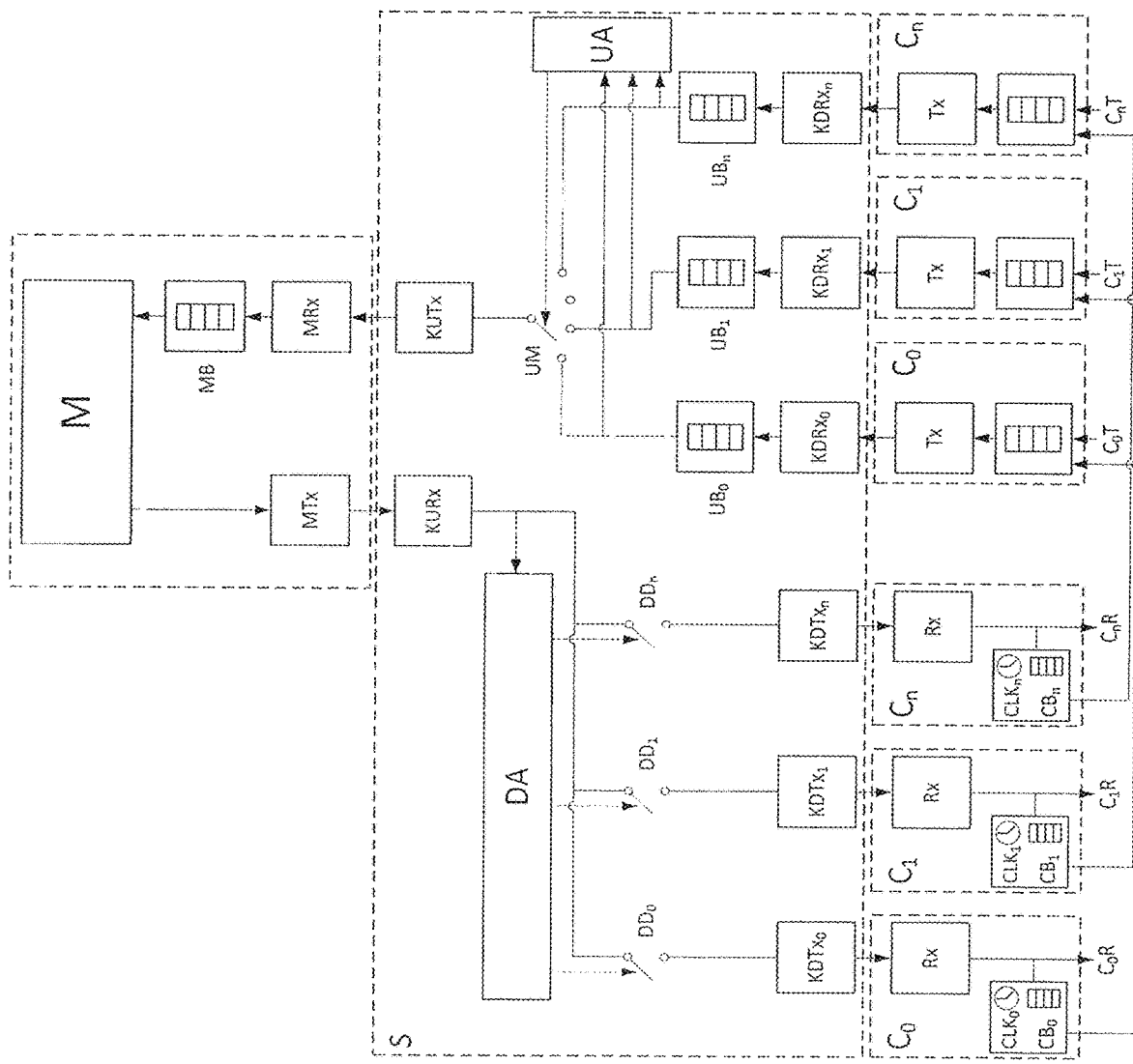
FIG. 3 in a schematic manner, in inner circuitry of a switch S as well as elements of clients and of a server platform.

The inner circuitry of a switch S is represented symbolically in FIG. 3. The construction which is represented in FIG. 3 for example is applied in particular in the switch of the uppermost level, i.e. the uppermost network node. Switches of the levels lying therebelow—inasmuch as they are present—can optionally also be designed accordingly, wherein at least the broadcast function should also be implemented onto the levels possibly lying therebelow.

In FIG. 3, components generally belonging to so-called uplinks (in the direction of the matcher) have a "U" in the reference, and components belonging to downlinks (in the direction of the client) have a "D".

A message (data packet; in particular with an order) is transmitted from the client $C_0 \ldots C_n$ via a transmitter Tx (a transmitter component). Thereby, a conversion for example into a serial data format takes place. This is received in the switch S and again converted in parallel ($KDRx_0 \ldots KDRx_n$) and written into the buffer ($UB_0 \ldots UB_n$). Thereby, a dedicated buffer is assigned to each first receiver ($KDRx_0 \ldots KDRx_n$; i.e. to each downlink), in the drawn embodiment example. It would also be possible to provide a central buffering in alternative embodiments.

The first arbiter UA decides on which packet is transferred further and controls the multiplexer UM accordingly. The data is now converted by the first switch transmitter KUTx again into a serial protocol, transmitted and converted again into parallel format by a matcher receiver MRx. The message reaches the matcher M via an optional matcher buffer MB.

If now the matcher M sends a message (for example the acknowledgment of receipt of an order) to a specific client $C_0 \ldots C_n$, then this message is converted via a matcher transmitter MTx again into a serial format, transmitted and received by the second switch receiver KURx and converted again into a parallel format. The second arbiter DA, by way of the address, now decides which client $C_0 \ldots C_n$ is to obtain the message, and closes the respective switch $DD_0$, $DD_1 \ldots$ or $DD_n$. The message is subsequently transmitted via a second switch transmitter $KTDx_0 \ldots KTDx_n$ to the respective client-receiver $Rx_0 \ldots Rx_n$ and is now available to the client $C_n$ for further processing.

Apart from the specific communication between the matcher and a specific client $C_0 \ldots C_n$ and which has been described above, there is yet the broadcast case: matcher to all clients $C_0 \ldots C_n$. This case differs from the specific case in that the second arbiter DA recognizes that it is the case of a broadcast message and now closes all switches $DD_0 \ldots DD_n$, so that finally the data packets are transmitted to all clients $C_0 \ldots C_n$.

According to the first aspect, each client is provided with a time generator, here in the form of a precisely synchronized clock $CLK_0 \ldots CLK_n$. The time reference for this clock can thereby be set by the matcher or by the uppermost network node (the uppermost switch), by way of this periodically sending out reference time messages, which then reset the local clocks $CLK_0 \ldots CLK_n$. The actual clock cycle can thereby be produced by a local oscillator or also by the global network clock cycle which in turn is set by the matcher M. According to the first aspect, each message from the client $C_0 \ldots C_n$ is now provided with a timestamp, and the network system ensures that older messages always arrive at the matcher first of all; the network therefore "sorts" the messages on account of the time. This function here is effected by way of the first arbiter UA transferring the older message first of all. The arbiter must await at least the time (waiting time) which arises due to unequal construction manners (e.g. cable lengths, component tolerances), so that this selection take its course fairly. Only then can the arbiter make its decision. The messages are therefore ordered strictly according to time, on each uplink or at least on the uplink of the uppermost network node, and with this arrive at the trading system M in the correct temporal sequence (also via several switch levels).

Even with such architecture, it may still occur that individual clients $C_0 \ldots C_n$ send many messages, and a switch S thus become overloaded. This would be manifested in a buffer overflow in one of the buffers $UB_0 \ldots UB_n$. A credit system can be introduced according to the second aspect, in order to prevent this: the trading system allots credits to all clients $C_0 \ldots C_n$. A credit permits the client to send an order (or more generally: a message). The number of credits is so large that an individual client can still operate at full speed in the case of a non-loaded system and that the individual buffers do not overflow even with a highly loaded system. A credit is deducted per message and is only credited when an acknowledgment of receipt has been sent from the matcher to the client.

Figure 4:
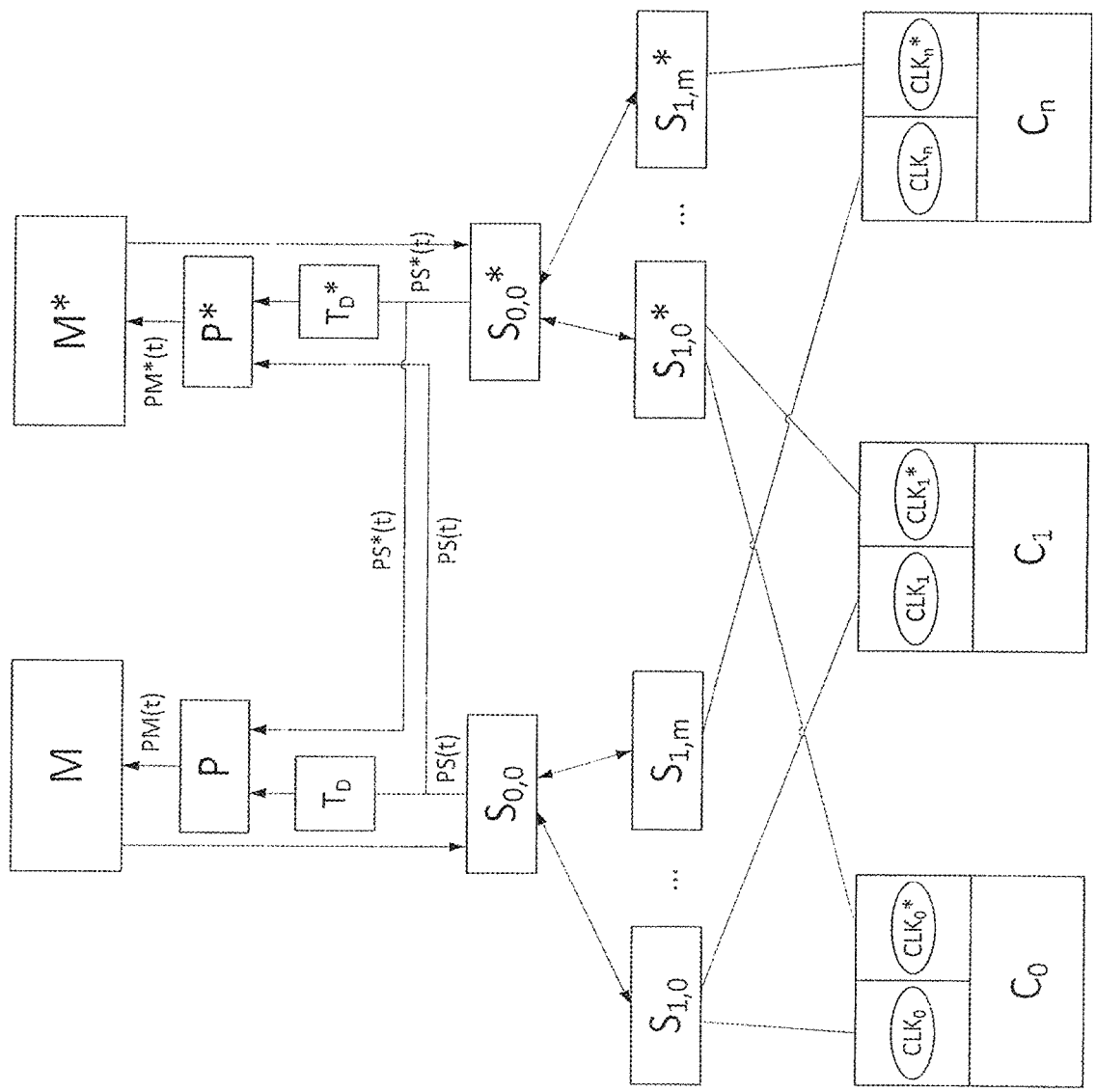
FIG. 4 a redundant electronic communication network.

A system which is redundant according to the third aspect of the invention is shown in FIG. 4. The principle of duplication is illustrated here by way of an embodiment example, with which the matcher is responsible for all titles.

The matcher M is duplicated to M*, as well as the network with the switches Si,j with Si,j*, in FIG. 4. One of the two matchers M or M* can thereby set the time (time master, i.e. the network clock cycle as well as the reference time), and the other matcher then adopts this time. In the case of a failure of one matcher, the other becomes the time master, if it was not already hitherto the time master. Both matchers are constructed in a completely identical manner with regard to the actual processing of messages, and the accounting and execution of the orders take place in both independently of one another.

The received message flows are transferred to the respective other trading system (PS(t) and PS*(t)), in order to ensure that both trading systems are in possession of all information, even with a partial failure of the network. So that their individual message flows are not favoured by the transmission, these are delayed by a delay time TD and TD*. The prioritisers P and P* now ensure that messages with earlier timestamps are taken first of all. Identical messages (which arrive via the two independent networks) are moreover suppressed in the prioritiser P. One can therefore guarantee that identical, temporarily ordered message flows are transmitted to the actual trading systems M and M*.

For reasons of redundancy, in each case two clocks CLK; CLK* can also be present on the part of the client data processing devices $C_0 \ldots C_n$. For example, both matchers can continuously inform over the course of time, and the information of the one matcher M serves for the synchronization of the one clock CLK, whilst the other matcher M* synchronizes the other clock CLK*. However, only the one time basis is used for the timestamp of the message sent twice, so that the timestamp is completely identical on both channels. For example, one can envisage a certain one of the clocks being responsible for the timestamps, as long as it functions, or one can ascertain as to which is more reliable via suitable algorithms, etc.

Figure 5:
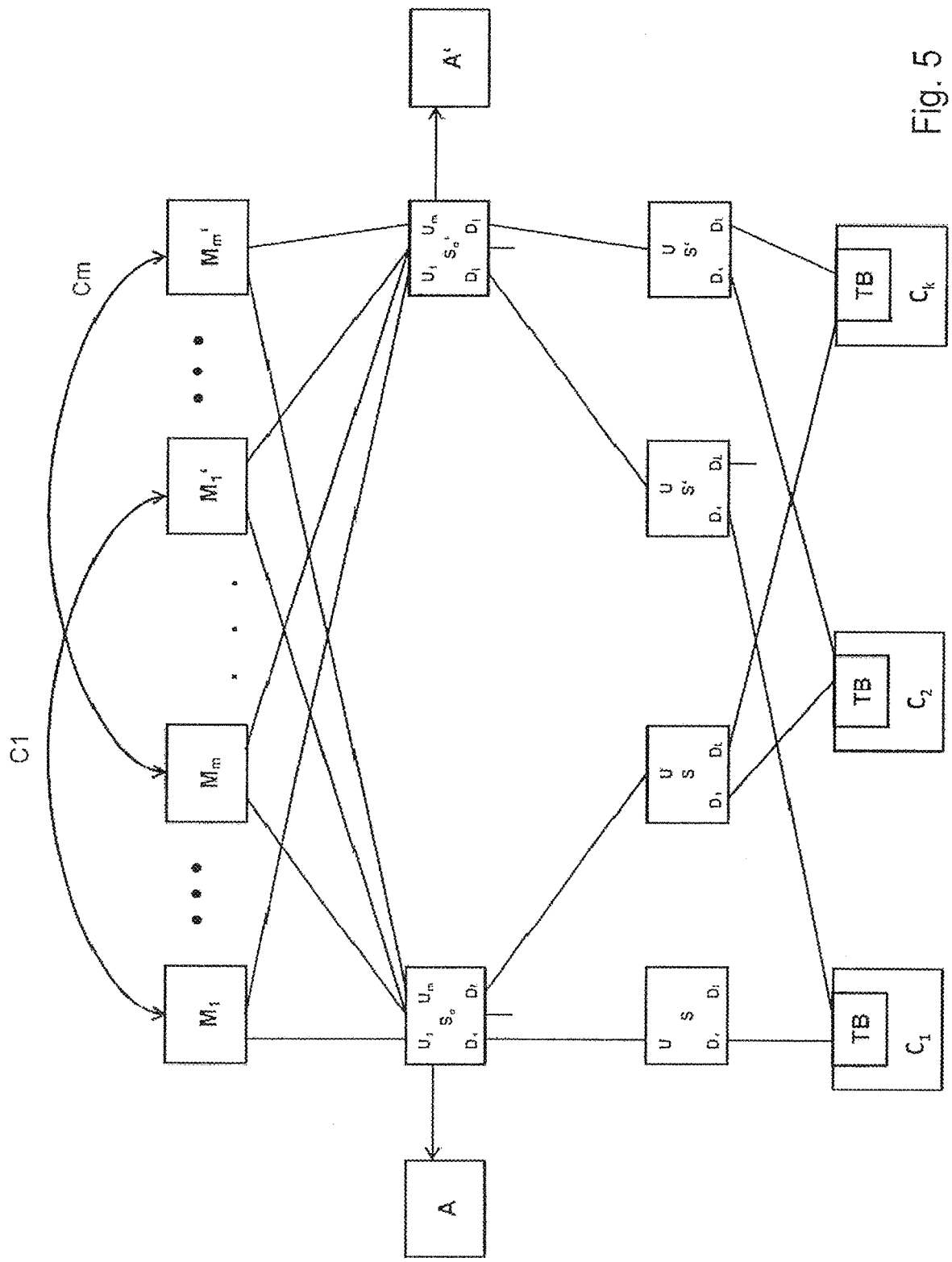
FIG. 5 a redundant electronic communication network with servers.

The implementation into a system as is represented in FIG. 2, with matchers $M_1, \ldots M_m$ with different competences is possible without further ado and is represented in FIG. 5. At least one matcher, preferably all matchers is/are present in duplicate and each are connected to both uppermost network nodes $S_{0,0}$, $S_{0,0}$*. Inasmuch as an archive A is connected to the uppermost network node, this can also be designed in a redundant manner, i.e. be present in duplicate, as is represented in FIG. 5 by way of the archive A'.

As in the case of FIG. 4 and as corresponds to an often advantageous procedure, in the embodiment according to FIG. 5, the switches $S_0$, S and $S_0'$, S' of both systems of switches are not connected to one another. The signals run independently of one another in both systems (and in duplicate as described above), but come together in the respective matchers.

The connections C1 . . . Cm in FIG. 5 indicate optional "private" connections between the matchers which correspond to one another and which permit a direct data exchange bypassing the network. As an alternative or complementarily to the method according to the fourth aspect, which will be described in more detail hereinafter, they can be used for example for the synchronization of the matchers corresponding to one another.

A further challenge is the resynchronisation of a client $C_0 \ldots C_n$ or of a matcher in the case that such a unit is also to participate again in the current trading affairs after an interruption. A lot of data which is based on the already executed transactions is produced by the complete trading system in normal operation. In the case of a restart, this places very high demands upon all participants, due to the fact that they need to synchronize again. This, as a rule was effected in the past by a "reference picture" of the current status and a tracking of all transactions since the reference picture. However, in this manner it can last a very long time until the unit is synchronized again, if the system is operated at the very limits of its capacity and no longer has any capacity for the tracking.

According to the fourth aspect of the invention, the synchronization is effected in steps. The functioning manner is explained in FIG. 6 by way of a simple linear array; more complex data structures can mostly be put together by way of several such arrays.

Figure 6:
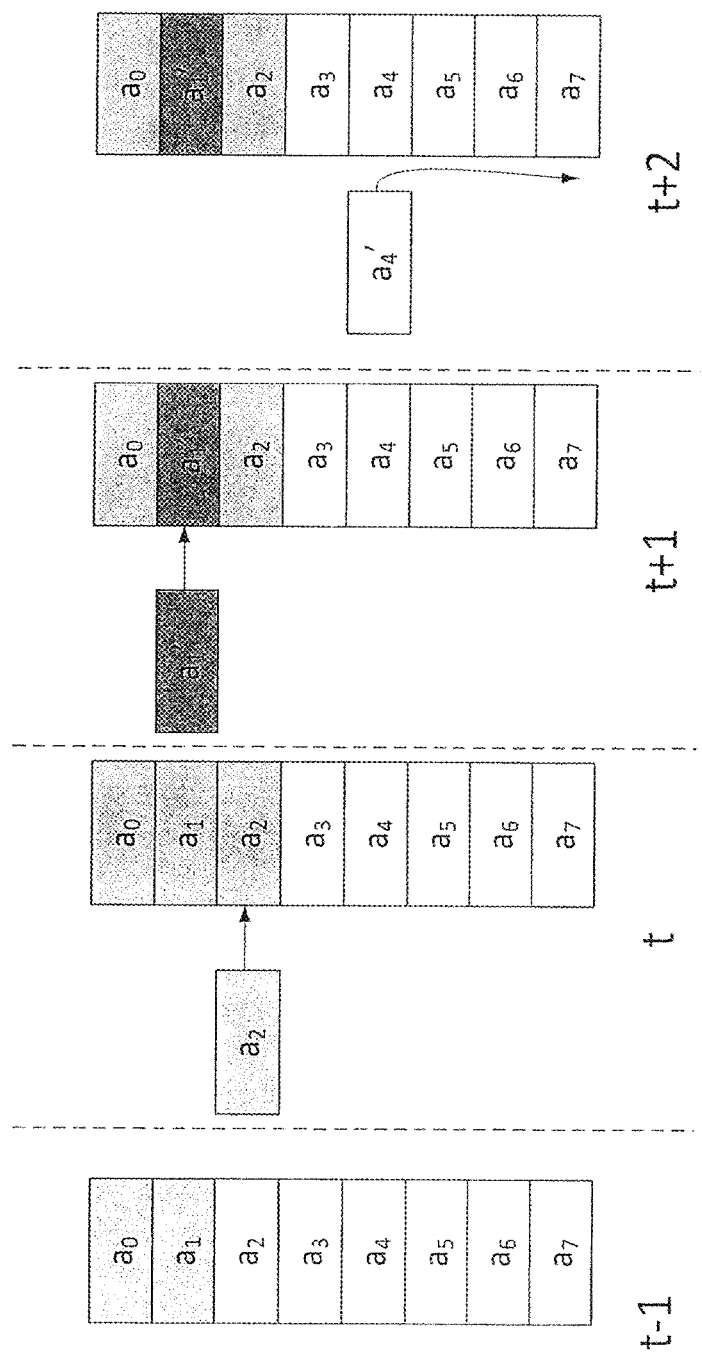
FIG. 6 the synchronization after the loss of a network participant (for example a client) after a failure.

The array as is represented in FIG. 6 for example can represent the order book for a certain title. The respective orders with the details specifications for instructions, for example sorted according to their temporal sequence are contained in this. The order book in these embodiments consists of different central data structures of a fixed size, in each case with clearly defined data elements for the respective data structure.

The fields which have a grey background in FIG. 6 show entries of the array which have already been synchronized afresh after a failure, and those fields with a white background are not yet synchronized. According to the fourth aspect, entries—of the order book and/or of other relevant elements—are continuously synchronized during normal operation, and specifically independently of whether a unit requires a new synchronization at all, or not. The synchronization in particular is effected by the matcher or, given a redundant system, inasmuch as the fault does originate from one of the two matchers, by both matchers. The synchronization follows linearly or logically linearly along the data structure, as is represented.

At least one individual entry can be synchronized for example after each transaction in the trading system (point in time t). If the trading system is not used to capacity, then several entries can also be effected. If now a new transaction (for example a change of an existing order, due to a part having been implemented by a purchase or sale) is effected on an entry which was already renewed (point in time t+1 in FIG. 6), then the respective entry is directly replaced. If an entry if effected on a part which has not yet been renewed (point in time t+2) then this is simply ignored. The resynchronisation of the unit which is newly adopted or readopted into the trading system is successively advanced in this manner, whilst the units which are not affected are in no way compromised. The data distribution begins afresh again when all data elements of the trading system have been distributed.

The trading system does not need to be "bothered" at all as to whether of the client data processing devices $C_0 \ldots C_n$ or partner trading systems are presently re-synchronizing thanks to this mechanism; the trading system simply does its task and arbitrary subsystems can autonomously resynchronize again. A large number of clients can simultaneously resynchronize in an autonomous manner thanks to this procedural manner.

The invention claimed is:

1. An electronic communication network comprising:
a server platform and
a plurality of client data processing devices;
wherein each client data processing device is configured to submit electronic messages to the server platform, and the server platform is configured to process these electronic messages;
wherein each client data processing device comprises a time generator and is configured to provide each electronic message with a timestamp which represents the point in time of the submission of the electronic message;
and wherein the server platform is configured such that incoming electronic messages are processed by the server platform strictly in a sequence corresponding to the timestamp;
the electronic communication network comprising at least one switch, wherein the switch is arranged to receive electronic messages from a plurality of the client data processing devices, comprises a buffer and is configured to store the electronic messages produced by the client data processing devices in the buffer, and to transfer the electronic messages in a manner sorted according to the timestamp provided to each electronic message by the time generator of the client data processing device submitting the electronic message, so that the electronic message with the oldest time is transferred first.

2. The electronic communication network according to claim 1, wherein at least one client data processing device comprises a network card, via which the client data processing device is connected to the server platform, and wherein the time generator is integrated into the network card.

3. The electronic communication network according to claim 2, wherein the time generators integrated into the network cards of all client data processing devices use identical hardware.

4. The electronic communication network according to claim 2, wherein the time generators of the client data processing devices run with a network clock cycle defined by the server platform.

5. The electronic communication network according to claim 1, wherein the time generators are continuously repeatedly synchronisable during operation, by way of the server platform or a trustworthy external source.

6. The electronic communication network according to claim 1, wherein the switch is configured to wait for a certain time before transfer of an electronic message, in order to compensate for possible running time differences of different electronic messages.

7. The electronic communication network according to claim 1, comprising two or more levels of switches which are linked to one another in a tree-like manner, wherein each switch on the two or more levels of switches comprises a buffer and is configured to store electronic messages produced by the client data processing devices in the buffer and to transfer the electronic messages in a manner sorted according to the timestamp provided to each electronic message by the time generator of the client data processing device submitting the electronic message, so that the electronic message with the oldest time is transferred first.

8. The electronic communication network according to claim 7 comprising several levels of switches, wherein each client data processing device is connected to the server platform data processing device via an identical number of switches.

9. The electronic communication network according to claim 1, comprising a second server platform which is configured such that all electronic messages in the server platform and in the second server platform are processed independently of one another and according to defined rules which are identical for the first server platform and the second server platform.

10. The electronic communication network according to claim 1, wherein the server platform or each server platform comprises a prioritiser which carries out a sorting according to the timestamp and/or suppresses identical electronic messages arriving multiple times.

11. The electronic communication network according to claim 1, wherein each trader data processing device is configured to monitor the number of unacknowledged electronic messages submitted to the trading platform and is configured such that a predefined maximal number of such unacknowledged electronic messages is not exceeded at any time.

12. The electronic communication network according to claim 11, wherein a sorting of the electronic messages according to the sequence corresponding to the timestamp is carried out in a unit with a buffer, and wherein the size of the buffer is selected such that it can accommodate the predefined maximum number of electronic messages.

13. The electronic communication network according to claim 11, wherein the server platform is structured in a tree-like manner with network nodes, and wherein sufficient buffer memory is present in each network node, in order to intermediately store all unanswered electronic messages of the clients data processing devices assigned to the network node.

14. The electronic communication network according to claim 1, wherein a state of the system can be represented by a number of data elements, and wherein the trading system is configured to send state data in each case representing the current state of the data element, in packets, in a continuous manner during operation and intermittently with the sending of electronic messages, to at least all client data processing devices, at least until a data packet has been sent for each data element representing the state of the system.

15. The electronic communication network according to claim 14, configured to send the state data in a continuously running manner, by way of the sending of state data for each data element beginning from afresh in each case after the sending of a data packet for each data element.

16. The electronic communication network according to claim 14, wherein each client data processing device is configured to process an electronic message concerning a data element, when state data for this data element is present, and to reject this electronic message when no state data for this data element is present.

* * * * *